United States Patent [19]

Tu

[11] 4,295,955

[45] Oct. 20, 1981

[54] ATTENUATION OF METAL CONTAMINANTS ON CRACKING CATALYST WITH A BORON COMPOUND

[75] Inventor: Hosheng Tu, Shorewood, Ill.

[73] Assignee: UOP Inc., Des Plaines, Ill.

[21] Appl. No.: 129,003

[22] Filed: Mar. 10, 1980

[51] Int. Cl.³ .............................................. C10G 11/04
[52] U.S. Cl. .................................... 208/120; 208/113; 208/52 CT; 208/114; 252/411 R
[58] Field of Search .......... 208/120, 121, 114, 52 CT; 252/411 R, 432, 433

[56] References Cited

U.S. PATENT DOCUMENTS

| | | | |
|---|---|---|---|
| 2,564,268 | 8/1951 | Mathy et al. | 208/114 |
| 2,579,133 | 12/1951 | Warner et al. | 252/413 |
| 2,636,845 | 4/1953 | Richardson et al. | 208/114 |
| 2,901,419 | 8/1959 | Brill | 208/119 |
| 3,297,565 | 1/1967 | Garwood et al. | 208/217 |
| 4,088,706 | 5/1978 | Kaeding | 585/408 |
| 4,192,770 | 3/1980 | Singleton | 208/120 X |

FOREIGN PATENT DOCUMENTS

| | | | |
|---|---|---|---|
| 556072 | 4/1958 | Canada | 208/114 |
| 2014468 | 8/1979 | United Kingdom | 252/414 |

*Primary Examiner*—Delbert E. Gantz
*Assistant Examiner*—G. E. Schmitkons
*Attorney, Agent, or Firm*—James R. Hoatson, Jr.; Louis A. Morris; William H. Page, II

[57] ABSTRACT

A contaminating metal on cracking catalyst used for the cracking of hydrocarbons is attenuated by contacting the catalyst with a boron compound at attenuation reaction conditions. The source of the contaminating metal may be the feedstock or residual metals resulting from the synthesis of the catalyst. The passivation is effected by impregnation with an aqueous solution of a water soluble boron compound, preferably in a separate passivation zone.

7 Claims, No Drawings

ATTENUATION OF METAL CONTAMINANTS ON CRACKING CATALYST WITH A BORON COMPOUND

BACKGROUND OF THE INVENTION

1. Field of the Invention

The field of art which the claimed invention pertains is the catalytic cracking of hydrocarbons. More specifically, the claimed invention relates to a process for the attenuation of contaminating metals on a fluidized cracking catalyst.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking process for the conversion of relatively high-boiling hydrocarbons to lighter hydrocarbons boiling in the heating oil or gasoline (or lighter) range. The hydrocarbon feed is contacted in one of more reaction zones with the particulate cracking catalyst maintained in a fluidized state under conditions suitable for the conversion of hydrocarbons.

A common problem in the fluid catalytic cracking process is the gradual deterioration of the catalyst due to the deposition on the catalyst of metal contaminants contained in the hydrocarbon feed, such as nickel, vanadium, iron, copper and titanium. These deposited metal contaminants increase the production of hydrogen, undesired light gases and coke at the expense of the highly desirable gasoline. A further disadvantage of high hydrogen and light gas yield is that a larger capital investment is required in equipment needed to deal with the large volume of gases.

The art teaches many techniques for dealing with these undesirable metal contaminants. Such techniques can be divided into two broad categories, one being the passivation or attenuation of the contaminants by reacting the catalyst with a passivating agent, which converts the metal contaminants to a relatively innocuous form, and the other being the physical removal of the contaminants from the catalyst. Examples of techniques falling within the former category are as taught or claimed in U.S. Patent Publication Nos. 2,758,097 (reaction with phosphorous pentoxide); 3,711,422 (reaction with an antimony compound) and 4,025,458 (reaction with chemical complexes containing antimony). Examples of techniques falling within the latter category are as taught or claimed in U.S. Patent Publication Nos. 3,252,918; 3,324,044; 4,013,546; and 4,014,815.

I have found a process for attenuating an undesired metal contaminant on a fluid cracking catalyst for use in a fluidized cracking system by reaction with a boron compound.

SUMMARY OF THE INVENTION

It is, accordingly, a broad objective of my invention to achieve attenuation of undesired metal contaminants on a fluid catalytic cracking catalyst.

In brief summary, my invention is a process for attenuating a metal on a fluidized cracking catalyst which has been contaminated with that metal, the catalyst being used in a fluidized cracking system. The catalyst is cycled between a cracking zone, in which the catalyst is contacted at an elevated temperature with a hydrocarbon feedstock, and a regeneration zone, in which carbonaceous residual material is oxidized and thereby removed from the catalyst. The source of metal contaminant is either the feedstock or residual metals which result from the synthesis of the catalyst. The process comprises contacting at least a portion of the catalyst at attenuation reaction conditions with a boron compound so as to effect an attenuation reaction between the metal and the boron compound thereby effecting the attenuation of the metal contaminant.

Other objectives and embodiments of my invention encompass details about catalyst composition, flow schemes, and attenuation reaction conditions, all of which are hereinafter disclosed in the following discussion of each of the facets of my invention.

DESCRIPTION OF THE INVENTION

Catalysts which can be used in the process of this invention include those known to the art as fluidized catalytic cracking catalysts. Specifically, the high activity aluminosilicate or zeolite-containing catalysts can be used and are preferred because of their higher resistance to the deactivating effects of high temperatures, exposure to steam, and exposure to metals contained in the feedstock. The well-known amorphous silica alumina catalysts may also be used.

Charge stocks used in the catalytic cracking process are mentioned here because contaminant metals such as nickel, iron, vanadium and copper found in the charge stock usually influence the regeneration operation, catalyst selectivity, catalyst activity and the fresh catalyst makeup rate required to maintain a constant activity. Metals contained in the feed are deposited on the catalyst and not only change its selectivity in the direction of less gasoline and more coke and light gas in a given reactor system but tend to deactivate the catalyst.

Another source of contaminating metals is the residual metals found on the catalyst resulting from its synthesis. The synthesis of the typical FCC catalyst begins with the preparation of a gelation product comprising an aqueous solution of an inorganic metallic salt usually an aluminum salt, but possibly other salts such as a titanium salt, which is commonly, but not necessarily mixed with an alkali-metal silicate. It has also become common to add crystalline aluminosilicate powder to the gelation product. The pH of the gelation product is then raised, usually stepwise, to a value of from about 3.5 to about 7.0 and the product is aged for up to about 3 hours. The gelation product is then dried, usually by spray drying.

Ideally, in the FCC catalyst hydrogel synthesis there will be a perfect interaction between the aluminum, oxygen and, silicon (if present) atoms to form a three dimensional structure comprising, for example, chains of atoms as follows:

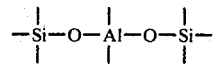

During gelation, however, part of the aluminum may not be incorporated into these chains, but instead become part of individual groups of atoms such as the compound Al₂O₃ or alumina, shown structurally as:

The alumina takes on the characteristics of a contaminating metal and will cause the same undesireable high hydrogen production, when the catalyst is used in an FCC process, as caused by contaminants such as iron, nickel, vanadium and copper which are contained in the feed and which deposit on the catalyst in the course of the FCC reaction.

In a typical FCC process flow, finely divided regenerated catalyst leaves the regeneration zone at a certain temperature and contacts a feedstock in a lower portion of a reaction riser zone. While the resulting mixture, passes up through the riser, conversion of the feed to lighter products occurs and coke is deposited on the catalyst. Reaction conditions are a temperature of from about 450° C. to about 570° C. and a pressure of from about atmospheric to about 25 psig. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reaction riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, contacts the spent catalyst purging adsorbed and interstitial hydrocarbons from the catalyst. The spent catalyst containing coke leaves the stripping zone and passes into a regenerating zone, where, in the presence of fresh regeneration gas and at a temperature of from about 620° C. to about 760° C., combination of coke and oxygen produces regenerated catalyst and flue gas containing carbon monoxide, carbon dioxide, water, nitrogen and perhaps a small quantity of oxygen. Usually, the fresh regeneration gas is air, but it could be air either enriched or deficient in oxygen. Flue gas is separated from entrained regenerated catalyst by cyclone separation means located within the regeneration zone, and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, which is the preferred mode of operation, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and, as previously mentioned, contacts the feedstock in a reaction zone.

One of the major obstacles in the processing of FCC feedstocks, such as residual stocks, which are contaminated with the aforementioned undesireable metals contaminants, is the harmful influence of even minute amounts of these metals. These metals, and in particular nickel, will contribute a dehydrogenating activity to the catalyst on which they deposit which is responsible for the production of additional hydrogen and coke on the catalyst. The residual metals resulting from the synthesis of the catalyst will contribute further to the dehydrogenating activity. The presence of large quantities of these metals also blocks access to cracking sites and can lower the activity of the catalyst.

While it would be ideal to remove these contaminants, such procedures may be quite elaborate and expensive. A simpler approach is to neutralize or attenuate the metals present on the catalyst. Such a procedure does not necessarily restore the full clean catalyst activity (since metals still block a percentage of the catalytic sites), but is quite helpful in lowering hydrogen gas production, which can overload gas compressors, from active metal influences.

I have found that contacting the fluid cracking catalyst with a boron compound will effect a substantial lessening in the formation of hydrogen and other light gases in the catalytic reactors. The boron is introduced in the form of an aqueous solution of a water soluble boron compound, preferably boric acid. The invention is implemented by obtaining a portion (slipstream) of regenerated catalyst prior to its introduction into the FCC reactors (for example, from the dipleg between the regenerator and reactor vessels), cooling and contacting that portion with the solution. The contacting may be effected batchwise, whereby a quantity of catalyst would be placed in a container, impregnated with the solution, dried and calcined. The contacting could also be effected continuously by maintaining a downwardly flowing catalyst bed in a vertical column and percolating the solution through the bed while continuously drying and calcining the catalyst as it is removed from the bottom of the column.

Attenuation reaction conditions are conditions which effect decomposition of the boron compound used and combinations of boron with the contaminating metals. Since the boron compound used is contacted with the catalyst, either batchwise or continuous, in an aqueous solution, the catalyst must first be cooled from the very high regenerator temperature at which it is acquired to less than about 100° C. to enable impregnation of the catalyst without immediately boiling away the water. Following impregnation, the catalyst is dried by evaporating off the water by conventional means usually involving the application of the boiling point temperature at the pressure used in the evaporation which could vary from a strong vacuum to ambient pressure. Following drying, the catalyst is calcined at about ambient pressure and a temperature from about 425° C. to about 815° C. for at least one-half of an hour. After being calcined the attenuated catalyst is added to the catalyst being cycled back to the reaction zone.

The amount of boron deposited on the catalyst is desirably such as to overcome the poisoning effects of the contaminant. This would typically involve from about 0.1 to about 5.0 percent by weight of boron, on an elemental basis, deposited on the catalyst.

Without being limited by any theory, I believe that my invention renders the metal contaminants inactive by effecting a chemical combination of the contaminants with the boron to form a relatively innocuous compound, e.g., a borate of the contaminating metal. This postulation finds support in the fact that the treated catalyst shows lower hydrogen yield than untreated (control) catalyst.

The following non-limiting examples are illustrative of the process of my invention wherein the contaminating metals comprise residual metals resulting from the synthesis of the FCC catalyst or are simulations of such contamination.

EXAMPLE I

This example describes the treatment of a metal contaminated non-zeolite containing catalyst in accordance with the process of the present invention.

A portion of a fresh FCC silica-alumina catalyst with a silica-alumina mole ratio of 2.14:1.00 was impregnated with sodium aluminate to obtain a simulated metal contaminated catalyst for use as a control. The impregnation was carried out in a conventional manner with an aqueous solution of sodium aluminate. The catalyst, after calcining, contained 5.0 wt. % $Al_2O_3$ from the impregnation.

A portion of the impregnated catalyst was attenuated in accordance with the process of my invention by impregnating that portion with an aqueous solution of boric acid in a sufficient amount to impart 4 wt. % boron on an elemental basis, to the catalyst following drying.

Samples of the above fresh, contaminated and attenuated catalysts were tested in an FCC pilot plant with the following results:

| Catalyst | Conversion, wt. % | Hydrogen Yield, scf/bbl |
|---|---|---|
| Fresh | 68.0 | 79 |
| Contaminated | 55.8 | 99 |
| Attenuated | 45.8 | 11 |

The above data indicates that alumina contamination causes an increase in hydrogen yield. Attenuation with boron has brought the hydrogen yield down to much less than that obtained with even the fresh control sample.

EXAMPLE II

This example describes the treatment of a fresh catalyst in accordance with the process of my invention. The catalyst comprised 20 wt. % zeolite in a matrix comprising 50 mole % silica and 50 mole % titania. A portion of the fresh catalyst was attenuated by impregnation with a boric acid solution in an amount sufficient to impart 0.5 wt. % boron, on the basis of $B_2O_3$, to the catalyst following drying.

Samples of the fresh and attenuated catalysts were tested in the FCC pilot plant with the following results:

| Catalyst | Conversion, wt. % | Hydrogen Yield, scf/bbl |
|---|---|---|
| Fresh | 74.1 | 211 |
| Attenuated | 81.2 | 116 |

The above data surprisingly illustrates that even fresh catalyst that has not been intentionally contaminated or contaminated from metallic impurities in a feedstock can benefit from the process of my invention. The data implies that there are in fact residual metals on the catalyst resulting from its synthesis and these metals contribute substantially to the undesirable yield of hydrogen. The process of my invention successfully attenuates these metals to achieve a substantial reduction in the hydrogen yield.

I claim as my invention:

1. A process for attenuating a metal on fluidized cracking catalyst which has been contaminated with said metal, said catalyst being used in a fluidized cracking system wherein said catalyst is cycled between a cracking zone, in which said catalyst is contacted at cracking temperature with a hydrocarbon feedstock, and a regeneration zone, in which carbonaceous residual material is oxidized and thereby removed from said catalyst, the source of said metal contaminant being said feedstock or residual metals resulting from the synthesis of said catalyst, which process comprises withdrawing a portion of said catalyst being transferred from said regeneration zone to said cracking zone as a slip stream, passing said slip stream to an independent attenuation zone, wherein said withdrawn portion of said catalyst is cooled to a temperature less than about 100° C. and thereafter is contacted with an aqueous solution of a boron compound to impregnate said boron compound upon said catalyst, drying said impregnated catalyst to remove water resultant from said aqueous solution, calcining said dried impregnated catalyst at a temperature of from about 425° C. to about 815° C. and adding said dried and calcined impregnated catalyst from said attenuation zone to the remaining portion of the catalyst being transferred from said regeneration zone to said cracking zone.

2. A process in accordance with claim 1 wherein said catalyst comprises alumina.

3. A process in accordance with claim 1 wherein said catalyst comprises crystalline aluminosilicate.

4. A process in accordance with claim 1 wherein the amount of boron deposited on said catalyst comprises on an elemental basis of from about 0.1 to about 5.0 percent by weight of said catalyst.

5. A process in accordance with claim 1 wherein said metal contaminant is included in the group comprising nickel, vanadium, iron, copper, titanium or aluminum.

6. A process in accordance with claim 1 wherein said boron compound comprises boric acid.

7. A process in accordance with claim 1 wherein said contact of said portion of said catalyst and said solution is carried out batchwise.

* * * * *